United States Patent
Hsu et al.

(10) Patent No.: US 12,416,956 B2
(45) Date of Patent: Sep. 16, 2025

(54) PIN ASSIGNMENTS BASED ON BANDWIDTH

(71) Applicant: Hewlett-Packard Development Company, L.P., Spring, TX (US)

(72) Inventors: Hengchang Hsu, Taipei (TW); Humberto Mario Fossati, Spring, TX (US); Ting-Yu Hsu, Taipei (TW)

(73) Assignee: Hewlett-Packard Development, L.P., Spring, TX (US)

( * ) Notice: Subject to any disclaimer, the term of this patent is extended or adjusted under 35 U.S.C. 154(b) by 324 days.

(21) Appl. No.: 17/795,021

(22) PCT Filed: Feb. 13, 2020

(86) PCT No.: PCT/US2020/018069
§ 371 (c)(1),
(2) Date: Jul. 25, 2022

(87) PCT Pub. No.: WO2021/162694
PCT Pub. Date: Aug. 19, 2021

(65) Prior Publication Data
US 2023/0054512 A1    Feb. 23, 2023

(51) Int. Cl.
*G06F 1/26*        (2006.01)
*G06F 13/10*       (2006.01)

(52) U.S. Cl.
CPC .......... *G06F 1/266* (2013.01); *G06F 13/102* (2013.01)

(58) Field of Classification Search
None
See application file for complete search history.

(56) References Cited

U.S. PATENT DOCUMENTS

| | | | |
|---|---|---|---|
| 9,164,930 B2 | 10/2015 | Zeng et al. | |
| 10,162,779 B2 | 12/2018 | Schnell | |
| 10,268,616 B2 | 4/2019 | Montero et al. | |
| 10,289,584 B2 | 5/2019 | Chiba | |
| 10,375,349 B2 | 8/2019 | Malemezian et al. | |
| 2013/0332642 A1 | 12/2013 | Capezza | |
| 2014/0372631 A1* | 12/2014 | Moore, Jr. | G06F 13/4252 710/11 |
| 2017/0017595 A1 | 1/2017 | Schnell | |
| 2019/0075338 A1* | 3/2019 | Liao | H04N 21/43632 |
| 2019/0121771 A1 | 4/2019 | Kadgi | |
| 2020/0183868 A1* | 6/2020 | Hunkins | G06F 13/4068 |
| 2020/0233822 A1* | 7/2020 | Zheng | G06F 3/1407 |

FOREIGN PATENT DOCUMENTS

JP    2017-033588 A    2/2017

\* cited by examiner

*Primary Examiner* — Fahmida Rahman
(74) *Attorney, Agent, or Firm* — Quarles & Brady LLP

(57) ABSTRACT

In example implementations, an apparatus is provided. The apparatus includes a cable interface, a video interface, an integrated chip, and a controller. The cable interface is to connect a host device via a cable. The video interface is to output video signals corresponding to visual data. The controller is communicatively coupled to the cable interface, the video interface, and the integrated chip. The controller assigns pairs of pins of the cable to transmit video signals based on the bandwidth used by the video signals. The controller also causes the host device to re-assign the pairs of pins of the cable to transmit the video signals.

18 Claims, 6 Drawing Sheets

PIN ASSIGNMENTS BASED ON BANDWIDTH

BACKGROUND

Universal serial bus (USB) cables can be used to transfer data between devices. USB cables have evolved over the years to become faster and provide more functionality. For example, USB cables have improved from the original USB cable to USB 2.0, USB 3.0 and now USB type-C (USB-C) cables.

USB-C cables are 24 pin double-sided connectors that can be used to transfer data and provide power. The USB-C cables can be used to transfer data at rates of 10 gigabytes (GB) per second (GB/s) to 20 GB/s.

DETAILED DESCRIPTION

Examples described herein provide an apparatus and method for automatically changing pin assignments in a USB-C cable based on an amount of video bandwidth used by a display. As discussed above, USB-C cables are 24 pin double-sided connectors that can be used to transfer data and provide power. The USB-C cables can be used to transfer data at rates of 10 gigabytes (GB) per second (GB/s) to 20 GB/s.

The configuration of the USB-C cables can be manually changed by changes made in a basic input/output system (BIOS) of a host device. For example, a user can go into the BIOS of a computer to change the pin assignments for a USB-C cable. This may be a complicated and laborious process for some users.

The present disclosure provides an apparatus (e.g., a docking station or a display) that can automatically change the USB-C pin assignments based on an amount of video bandwidth used by a display. For example, for some resolution settings, a monitor may use a certain amount of video bandwidth. The USB-C default pin assignment may use 2 of the four available pairs for assignment for video and 2 of the four available pairs for assignment for USB 3.0 data transfer. However, for some images at certain resolutions, 2 pairs of pins in the USB-C cable may not provide enough bandwidth.

In an example, the apparatus calculates the amount of video bandwidth that is to be used when a display is initially connected. Based on the amount of video bandwidth, the apparatus may automatically assign the appropriate pins in the USB-C cable to transfer video data. The apparatus may then automatically cause the host device to change settings in the host device that correspond to the pin assignments of the USB-C cable set in the apparatus. As a result, the pin assignments of the USB-C cable may be automatically switched.

Figure 1:
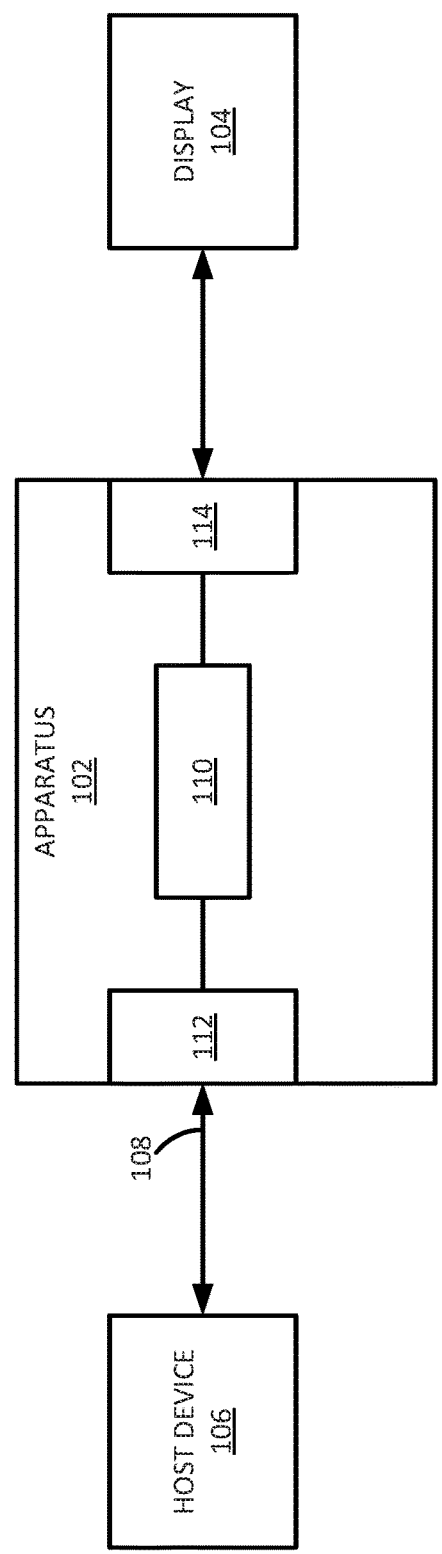
FIG. 1 is a block diagram of an example system that includes an apparatus to automatically assign pins of a high-speed cable based on an amount of video bandwidth used by a video output of the present disclosure.

FIG. 1 illustrates an example system 100 of the present disclosure. In an example, the system 100 may include an apparatus 102, a display 104, and a host device 106. The apparatus 102 may be communicatively coupled to the display 104 and the host device 106. In an example, the host device 106 may be communicatively coupled to the apparatus 102 via a high-speed cable 108.

In an example, the high-speed cable 108 is a cable that can transmit data at rates of greater than 5 gigabits (Gb) per second (s). In an example, the high-speed cable can transmit data at rates between 5 Gb/s to 40 Gb/s. The high-speed cable 108 can also transfer video data and provide power to the host device 106. The high-speed cable 108 includes pins that can be reconfigured to perform different functions or transfer different types of data. An example of the high-speed cable 108 capable of the above features is a USB-C cable. However, it should be noted that any type of video/data cable or connection that can be re-configured and provide high-speed data transfer may be within the scope of the present disclosure.

In an example, the apparatus 102 may be a docking station or may be combined with the display 104 as a single unit. The apparatus 102 may include an interface 112 to connect to the high-speed cable 108, a controller 110, and an interface 114 to connect to the display 104. The controller 110 may be a single processor, or a combination of processors or devices that operate together, to automatically assign or re-assign pins of the high-speed cable 108 depending on the amount of video bandwidth used by the display 104 or any other video output of the apparatus 102.

As discussed in further details below, the controller 110 may calculate the amount of video bandwidth that is used and determine if the assignment of the pins of the high-speed cable 108 should be changed. For example, certain pins or pairs of pins in the high-speed cable 108 can be assigned to transmit data or video signals/data. Each assignable pin of the high-speed cable 108 can transmit a certain amount of video data. The controller 110 may determine how many of the assignable pins are assigned to transmit video signals/data to determine an amount of video bandwidth that is available on the high-speed cable 108 under a current pin assignment.

The amount of video bandwidth may be based on characteristics of a video image that is to be transmitted. For example, the amount of video bandwidth may be based on a resolution (e.g., a number of pixels per horizontal line and vertical line), a refresh rate of the image, a number of bits of the video image, and the like. The video bandwidth may indicate how much bandwidth for transmitting video should be available in the high-speed cable 108.

Based on the calculation, the video bandwidth used by the video image may be greater than the available video bandwidth of the high-speed cable 108 under the current pin assignment. The controller 110 can determine that the pins should be re-assigned and automatically re-assign the pins. The re-assignment of the pins may cause the host device 106 to set a configuration in accordance with the assignment of the pins set by the controller 110. In other words, the pin assignment may occur under control of the controller 110 and without manually intervention. The host device 106 may then transfer data in accordance with the pin assignments set by the apparatus 102.

In an example, the host device 106 may be a desktop computer, a laptop computer, a tablet computer, and the like. The host device 106 may want to display video on the display 104. As noted above, to change the pin assignments of the high-speed cable 108, a user previously would manually change the assignments via the BIOS of the host device 106. However, the apparatus 102 of the present disclosure allows the pin assignments to be changed or set automatically.

Figure 2:
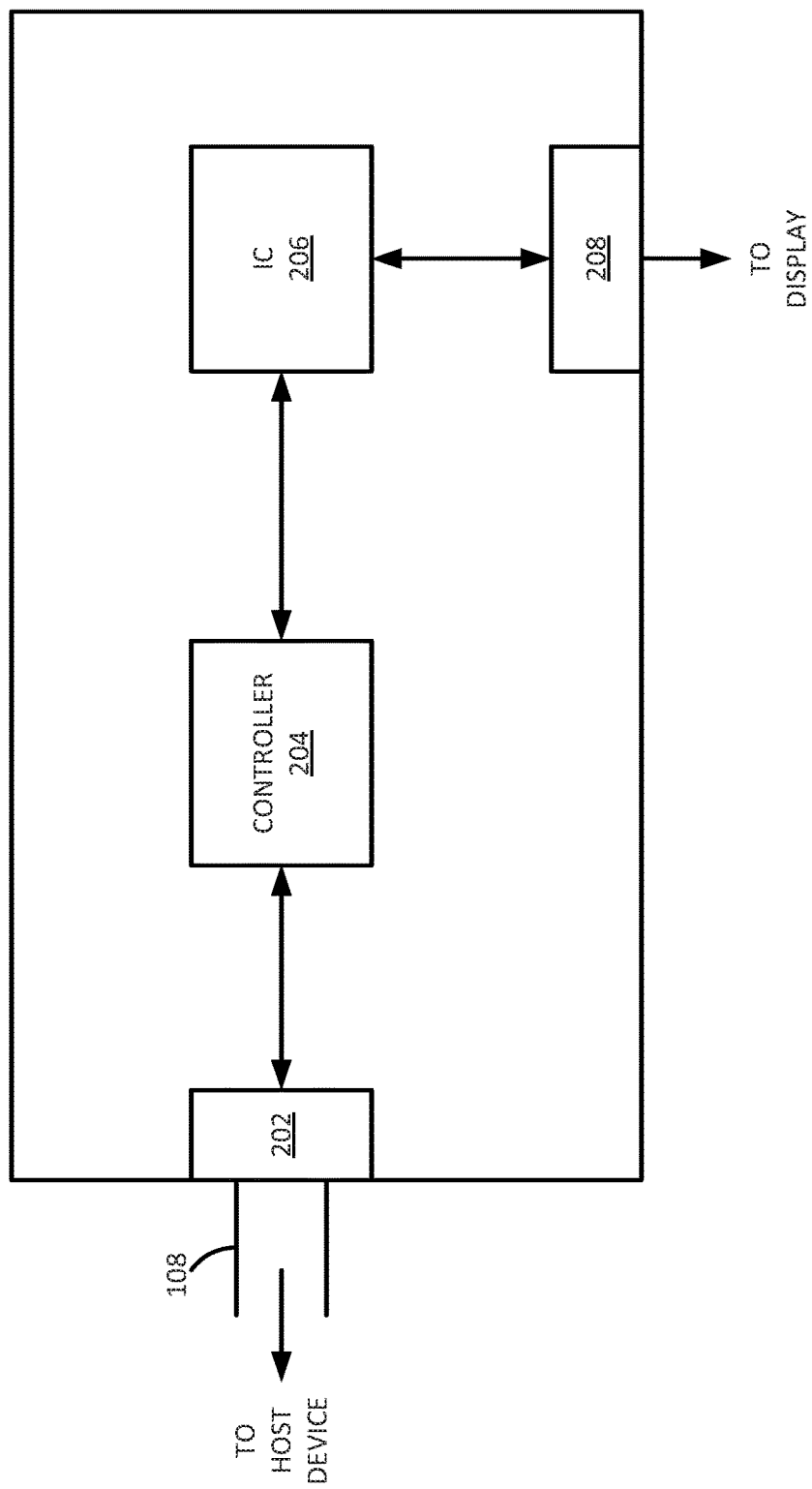
FIG. 2 is a block diagram of an example of the apparatus of the present disclosure.

FIG. 2 illustrates a block diagram of an example of the apparatus 102 of the present disclosure. In an example, the apparatus 102 may include a high-speed cable interface 202, a controller 204, an integrated chip (IC) 206, and a video interface 208. The high-speed cable interface 202 may be a port or coupling that allows the high-speed cable 108 to be connected to the apparatus 102. The high-speed cable interface 202 may have pins or openings that correspond to the pins of the high-speed cable 108 to form a secure connection. For example, the pins of the high-speed cable 108 may be inserted into the corresponding openings of the high-speed cable interface 202.

In an example, the video interface 208 may provide a connection to the display 104 to output signals corresponding to visual data. For example, the visual data may include video, video signals, video data, images, and the like. The video interface 208 may transmit video data received from the host device 106 to the display 104. In an example, where the apparatus 102 is a docking station, the video interface 208 may be a port or a connection that coincides with a type of video cable used to connect to the display 104. For example, the video interface 208 may be a display port, a high definition media interface (HDMI) port, a thunderbolt port, a video graphics adapter (VGA) port, and the like. In an example, where the apparatus 102 is part of the display 104, the video interface 208 may be a connection between the IC 206 and the graphics processor of the display 104.

In an example, the IC 206 may be a monolithic semiconductor chip that includes a set of electronic circuits. The IC 206 may be printed as a unit using photolithography rather than being constructed one transistor or layer at a time as done with discrete processors. Examples of the IC 206 may include a scaler chip or a display port (DP) multi-streaming transport (MST) hub chip. The IC 206 may be a scaler chip when the apparatus 102 is combined as part of the display 104 or may be a DP MST hub chip when the apparatus 102 is deployed as a stand-alone docking station.

In an example, the IC 206 may calculate the amount of video bandwidth used by the display 104. For example, when the display 104 is initially connected to the apparatus 102 via the video interface 208, the IC 206 may communicate with the display 104 to determine an amount of video bandwidth that is used by the display 104 or video that is output from the video interface 208. In an example, the amount of video bandwidth that is used may be based on a highest resolution of the display 104 and/or the amount of bandwidth used by video that is output at the highest resolution.

In an example, the IC 206 may determine if the current pin assignments for the high-speed cable 108 are sufficient to provide the amount of video bandwidth used by the video or the display 104. In other words, the IC 206 may determine if the pin assignments for the high-speed cable 108 provide enough bandwidth or data throughput to transmit the video in a desired resolution, format, refresh rate, and the like, to the display 104. If the current pin assignments are not sufficient, the IC 206 can control the controller 204 to change or re-assign the pin assignments for the high-speed cable 108.

For example, the IC 206 may communicate the amount of video bandwidth that is used to the controller 204. The IC 206 may communicate with the controller 204 over a low-speed bus (e.g., an inter-integrated circuit (I2C) bus). The IC 206 may cause the controller 204 to set the pin assignments in accordance with the amount of video bandwidth that is used by the video or the display 104.

In an example, the controller 204 may be a processor or an application specific integrated circuit (ASIC). The controller may execute instructions stored in memory to perform the functions described herein or may be programmed (e.g., in the case of an ASIC) to perform a function.

In an example, the controller 204 may then present a single option for the pin assignment of the high-speed cable 108 to the host device 106. Thus, the controller 204 may cause the host device 106 to automatically set the pin assignments for the high-speed cable 108 to provide enough bandwidth for the video and/or the display 104. In other words, the pin assignments are not changed manually through the BIOS of the host device 106.

Figure 3:
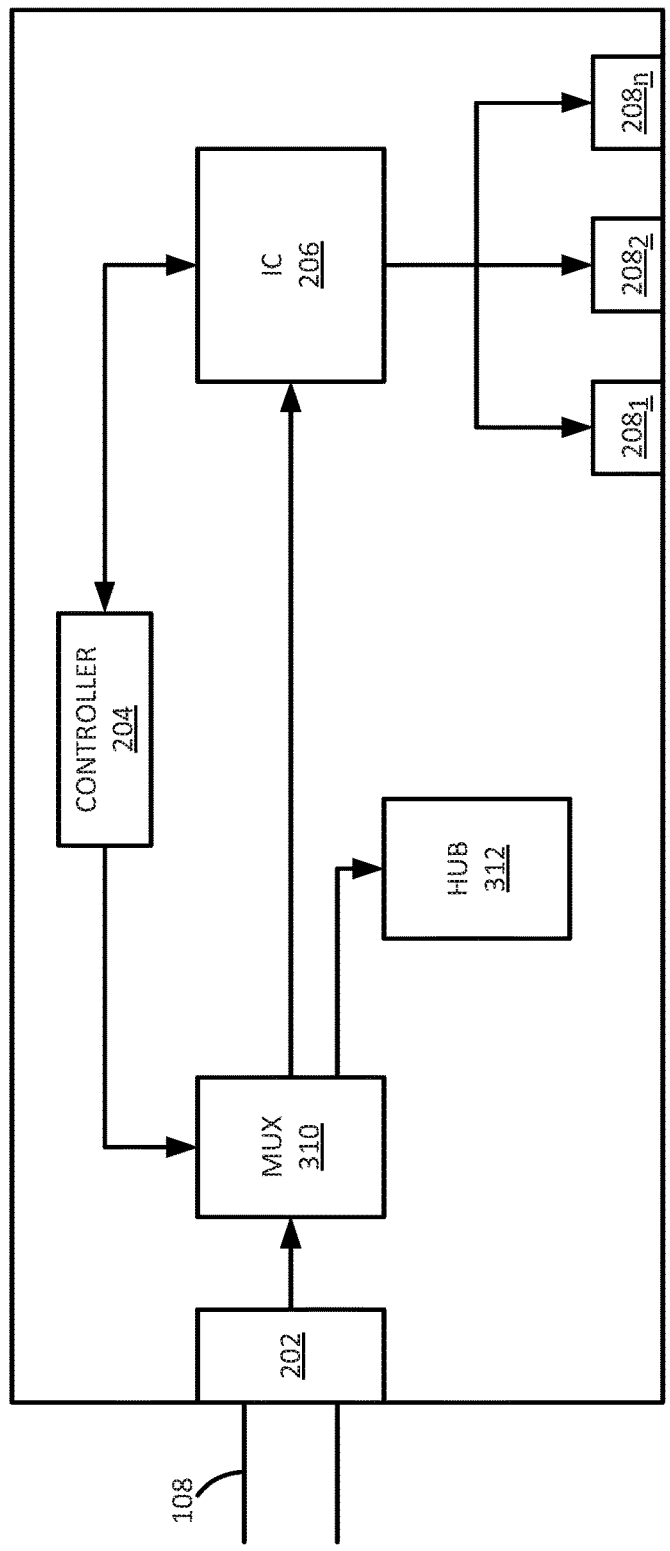
FIG. 3 is a more detailed block diagram of the example apparatus of the present disclosure.

FIG. 3 illustrates a more detailed block diagram of the apparatus 102. In an example, the apparatus 102 may include the high-speed cable interface 202, the controller 204 and the IC 206, as illustrated in FIG. 2, and discussed above. In an example, the apparatus 102 may include a plurality of video interfaces $208_1$ to $208_n$ (herein also referred to individually as a video interface 208 or collectively as video interfaces 208).

In an example, the IC 206 may determine an amount of video bandwidth used by the video and/or displays each time a display 104 is connected to a video interface $208_1$ to $208_n$. As a result, the pin re-assignment performed by the controller 204 may be dynamically changed. For example, when a first display is connected to the video interface $208_1$, the resolution may be low enough that the current pin assignments of the high-speed cable 108 are sufficient to transmit the video data to the first display.

However, at a later time after the first display is connected, a second display may be connected to the video interface $208_2$. The IC 206 may determine that the video bandwidth used for the resolution of the second display is higher than the available bandwidth on the current pin assignments of the high-speed cable 108. As a result, the IC 206 may cause the controller 204 to change the pin assignments and cause the host device 106 to also change the pin assignments accordingly in response to the determination that the video bandwidth used for the second display is higher than the available bandwidth on the current pin assignments of the high-speed cable 108.

At a later time after the pin assignments for the high-speed cable 108 are implemented for the second display, the second display may be disconnected. The IC 206 may determine the pin assignments and communicate the pin assignments to the controller 204. The IC 206 can cause the controller 204 to change the pin assignments again to accommodate the lower resolution and lower video bandwidth use of the first display.

In an example, the pin assignments for the first display and the second display can be stored in memory. As a result, if the second display is connected to the video interface $208_2$ again, the IC 206 may obtain the pin assignments to be implemented from the memory. Some processing can be skipped (e.g., the determination of the video bandwidth used for the resolution of the second display) and the pin assignments can be implemented more efficiently.

In an example, the apparatus 102 may include a multiplexer (mux) 310 and a hub 312. The multiplexer 310 may be a USB-C 4:6 multiplexer when the high-speed cable 108 is a USB-C cable. The mux 310 maps the pin assignments and changes to the pin assignments made by the controller 204. Thus, the mux 310 routes the data received via the high-speed cable 108 to the hub 312 and/or the IC 206 based on the pin assignments. For example, if the pin assignments assign each of the high-speed data pins of the high-speed cable for video data, the mux 310 may route the video data from each of the high-speed data pins to the IC 206. However, if some of the high-speed data pins are assigned for video data and other high-speed data pins are assigned for USB 3.0 data transfer, the mux 310 may route the video data to the IC 206 and the USB 3.0 data transfer to the hub 312.

In an example, the hub 312 may be used to connect other USB 3.0 devices to the apparatus 102. For example, when data is transferred via USB 3.0 protocol over the high-speed cable 108, the data may be routed to the hub 312. The hub 312 may then transmit the data to the appropriate device connected to the apparatus 102. The hub 312 may include interfaces or input/output ports to connect to the USB 3.0 devices.

Figure 4:
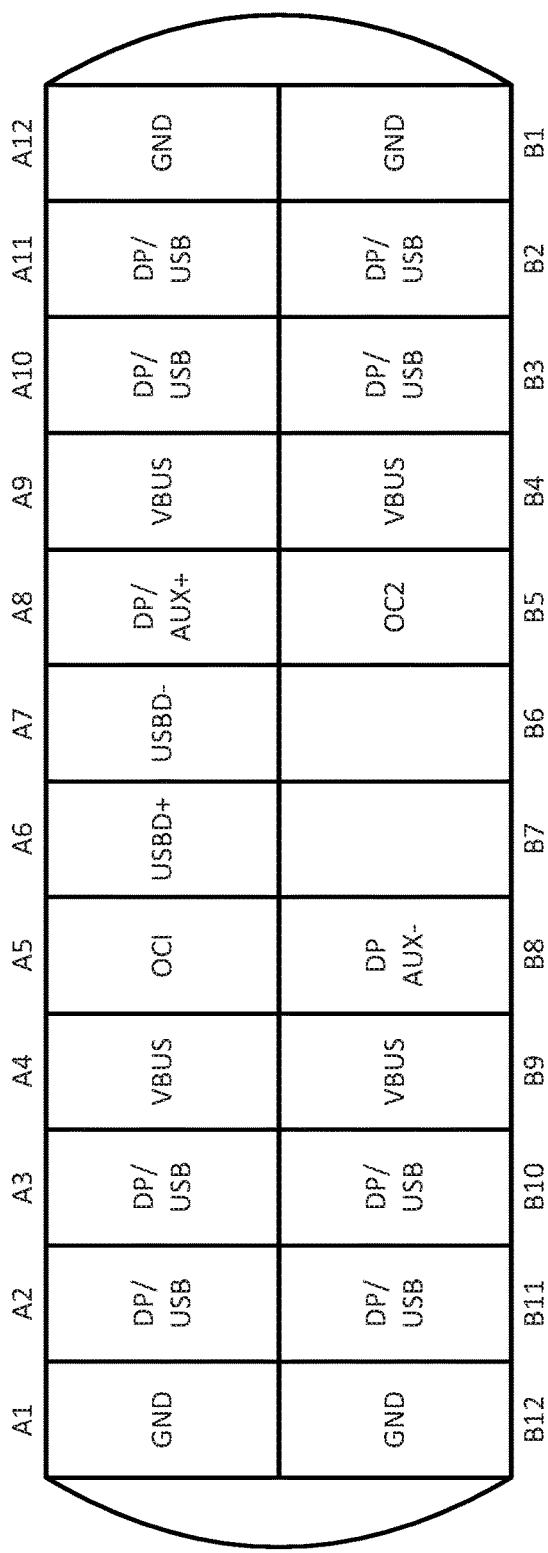
FIG. 4 is a block diagram of example pins of the high-speed cable of the present disclosure.

FIG. 4 illustrates a block diagram of example pins of a high-speed cable 108 of the present disclosure. The pin layout illustrated in FIG. 4 is an example of pins for a USB-C cable.

In an example, the high-speed cable 108 may include 12 pairs of pins (A1-A12 and B1-B12). Some of the pins may be assigned as ground pins and provide power (e.g., ground (GND) pins (A1, B12) and (A12, B1) and VBUS pins (A4, B9) and (A9, B4)). Some pins may be assigned to provide digital audio (e.g., display port (DP) auxiliary (AUX)– pin B8 and DP AUX+ pin A8). Some pins may be assigned to communicate configuration information (e.g., side band channels OC1 pin A5 and OC2 pin B5). Some pins may be assigned to provide USB 2.0 data transfer rates (e.g., USBD+ pin A6 and USBD– pin A7).

However, the high-speed cable 108 may include 4 pairs of high-speed data pins that can be re-assigned to transfer different types of data. For example, the pin pairs (A2, A3), (B10, B11), (B2, B3), and (A10, A11) can be switched between video data for display port (DP) or USB 3.0 data transfer. Thus, in an example when referring to re-assignment of pins or changing pin assignments, the controller 204 may change the assignment of the pairs of high-speed data pins (A2, A3), (B10, B11), (B2, B3), and (A10, A11). The pairs of high-speed data pins may be re-assigned or changed between transmitting data using USB 3.0 and transmitting video data for DP.

In an example, when the controller 204 presents a single pin configuration for the high-speed cable 108 to the host device 106, the single pin configuration may be related to the assignment of the pairs of high-speed data pins to either using USB 3.0 or transmitting video data for DP.

Notably, when the pin assignments are changed or re-assigned, the high-speed cable 108 still provides power to the host device 106. In addition, other types of data may still be transferred using a lower transfer rate of USB 2.0 (e.g., via pins A6 and A7).

Figure 5:
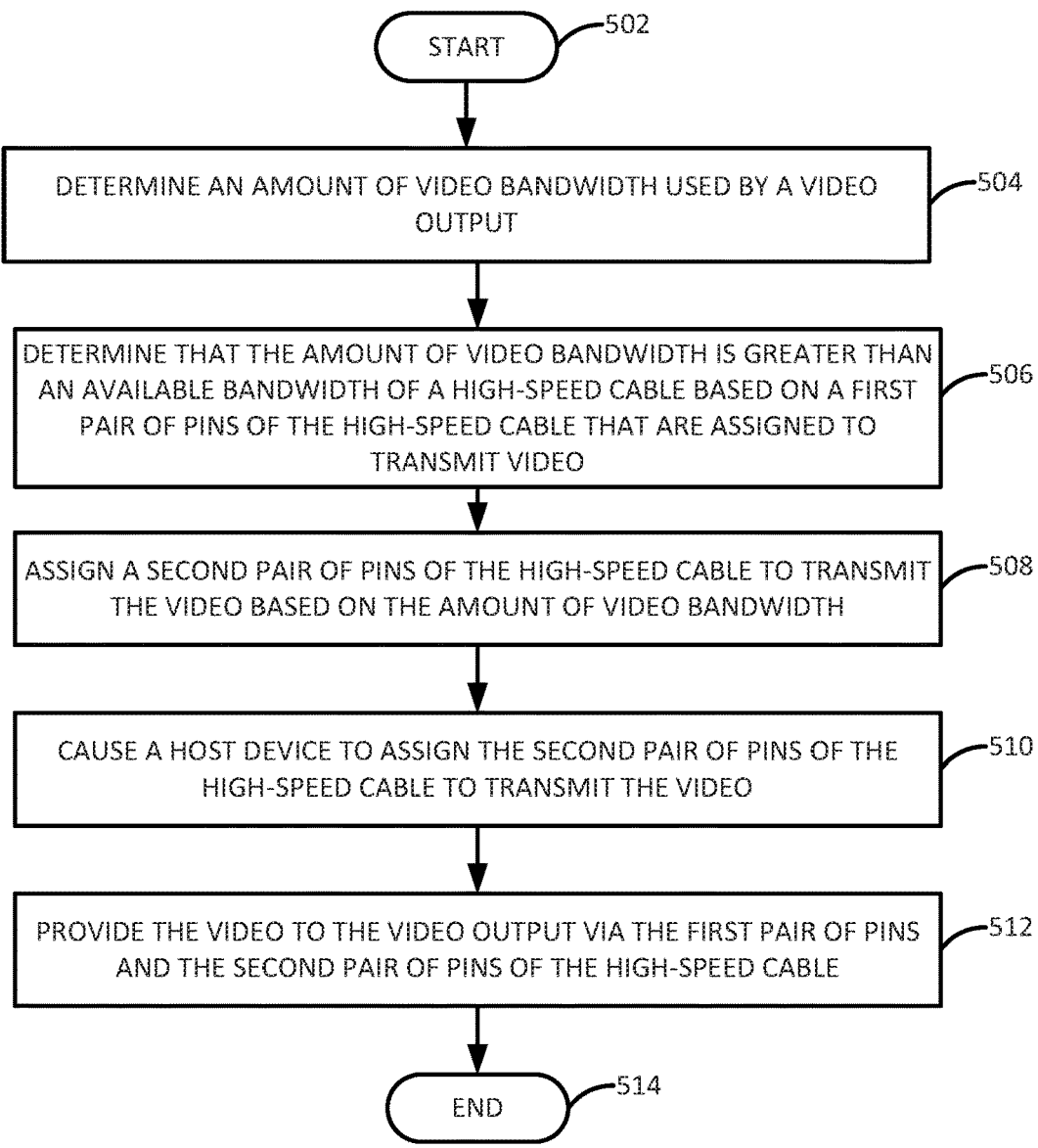
FIG. 5 is a flow chart of an example method for automatically assigning pins of a high-speed cable based on an amount of video bandwidth used by a video output of the present disclosure.

FIG. 5 illustrates a flow diagram of an example method 500 for automatically assigning pins of a high-speed cable based on an amount of video bandwidth used by a video output of the present disclosure. In an example, the method 500 may be performed by the apparatus 102 or the apparatus 600 illustrated in FIG. 6, and described below.

At block 502, the method 500 begins. At block 504, the method 500 determines an amount of video bandwidth used by a video output. In an example, the amount of video bandwidth may be determined when a display is initially connected to a video interface or communicatively coupled to a processor that is executing the method 500. For example, a processor in an apparatus (e.g., a docking station or a part of the display) may communicate with the display to determine how much video bandwidth will be used by the video output.

In an example, the amount of video bandwidth used by the video output may be determined each time a new connection is detected. For example, there may be a plurality of video interfaces, and another display may be connected to the video interface. The amount of video bandwidth used by the video output of the newly connected display and/or a combination of all video outputs may be determined.

In an example, the amount of video bandwidth may be calculated based on a resolution of the display. In an example, the calculation may be based on a highest resolution of the display.

At block 506, the method 500 determines that the amount of video bandwidth is greater than an available bandwidth of a high-speed cable based on a first pair of pins of the high-speed cable that are assigned to transmit video. In an example, the pins of the high-speed cable may have a default pin configuration. The pin configuration may be assigned by a controller and the assignments may be mapped to the physical pins of the high-speed cable by a multiplexer. For example, two pairs of high-speed pins may be set to transfer data using USB 3.0 and two pairs of the high-speed pins may be set to transfer video data for DP connections. However, the amount of video data that can be transferred by the two pairs of high-speed pins assigned to video data may not be sufficient for the amount of video bandwidth calculated in block 504. In other words, the amount of video bandwidth used by the video output may be greater than the amount of video data that can be transferred by the default setting of two pairs of high-speed pins for video data.

At block 508, the method 500 assigns a second pair of pins of the high-speed cable to transmit the video based on the amount of video bandwidth. For example, other pins of the high-speed cable may be able transmit video data, but may be currently assigned to transmit other types of data. These other pins can be re-assigned to transmit video data instead of the other types of data. Using a USB-C cable as an example, two pairs of the high-speed pins assigned to transfer data using USB 3.0 can be re-assigned to transmit video data. The change in pin assignments can be mapped by a 4:6 mux within the docking station or display apparatus. For example, two pairs of pins (A2, A3) and (B10, B11) may have a default assignment to transfer data using USB 3.0. The processor may change the assignment for the pairs of pins (A2, A3) and (B10, B11) to transfer video data instead.

At block 510, the method 500 causes a host device to assign the second pair of pins of the high-speed cable to transmit the video. In an example, a processor or controller of an apparatus that performs the method 500 may communicate with the host device. The processor may present a single configuration option of the pins or pin assignment to the host device. The host device may then be forced to select the single pin assignment presented by the processor. The host device may automatically implement the pin assignment as instructed by the processor.

At block 512, the method 500 provides the video to the video output via the first pair of pins and the second pair of pins of the high-speed cable. For example, the host device may transmit video data over the pins that are assigned to transmit video data. The video data may then be provided to the video interface or output to be shown on the display in the desired resolution. At block 514, the method 500 ends.

Figure 6:
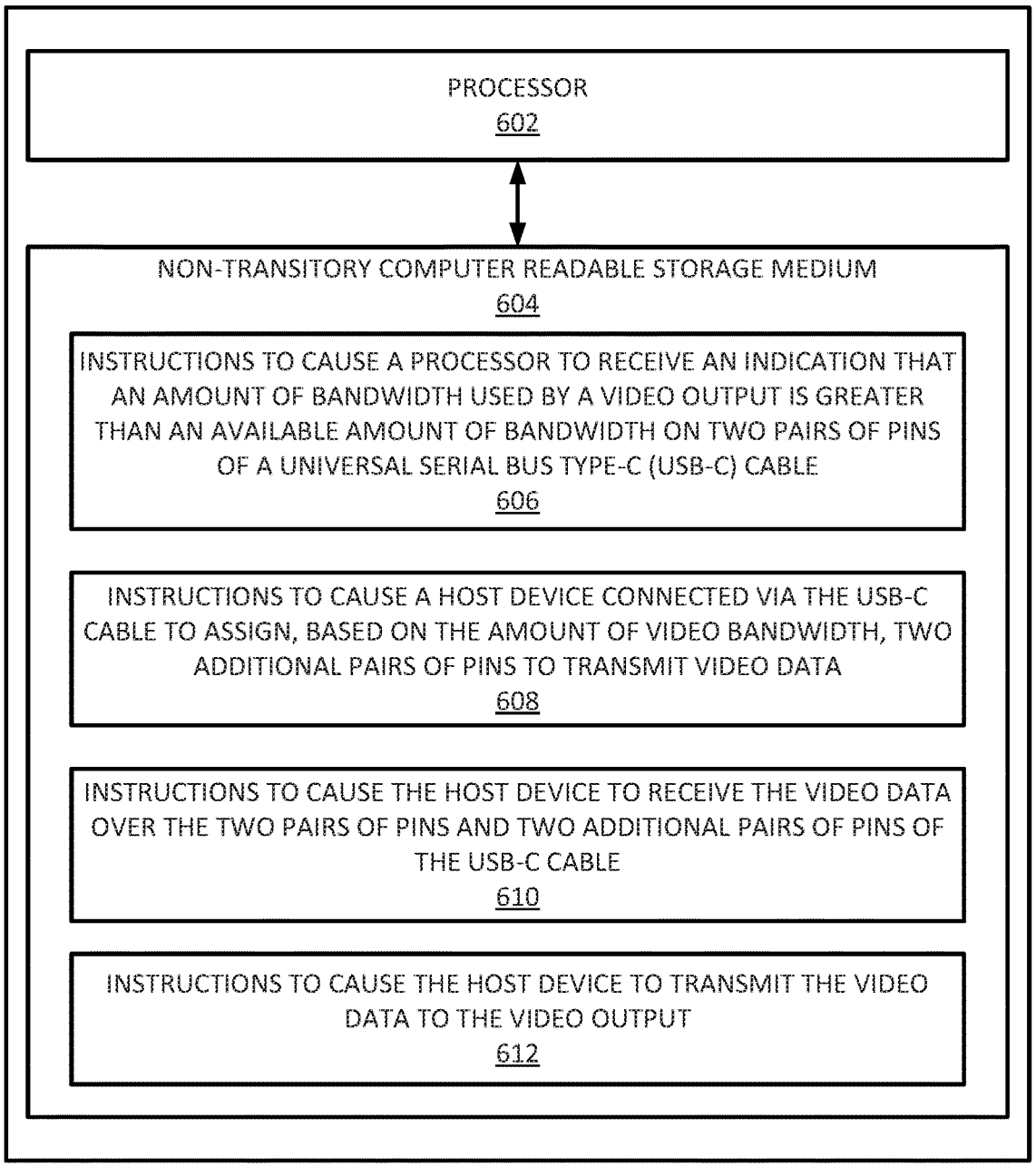
FIG. 6 is a block diagram of an example non-transitory computer-storage medium storing instructions executed by a processor to automatically assign pins.

FIG. 6 illustrates an example of an apparatus 600. In an example, the apparatus 600 may be the apparatus 102. In an example, the apparatus 600 may include a processor 602 and a non-transitory computer-readable storage medium 604. The processor 602 may be a central processing unit (CPU), a graphical processing unit (GPU), an application specific integrated circuit (ASIC), and the like. Although a single processor 602 is illustrated in FIG. 6, it should be noted that multiple processors 602 may be deployed to execute the instructions stored in the non-transitory computer-readable storage medium 604 in a distributed computing environment.

In an example, the non-transitory computer-readable storage medium 604 may include a hard-disk drive, a random access memory (RAM), a read-only memory (ROM), a solid state drive, and the like. The non-transitory computer-readable storage medium 604 may include instructions 606, 608, 610, and 612. The processor 602 may access the non-transitory computer-readable storage medium 604 to obtain the instructions 606, 608, 610, and 612. The processor 602 can then execute the instructions 606, 608, 610, and 612 to perform various functions.

In an example, the instructions 606 may include instructions to cause a processor to receive an indication that an amount of bandwidth used by a video output is greater than an available amount of bandwidth on two pairs of pins of a universal serial bus type-C (USB-C) cable. The instructions 608 may include instructions to cause a host device connected via the USB-C cable to assign, based on the amount of video bandwidth, two additional pairs of pins to transmit video data. The instructions 610 may include instructions to cause the host device to receive the video data over the two pairs of pins and the two additional pairs of pins of the USB-C cable. The instructions 612 may include instructions to cause the host device to transmit the video data to the video output.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a cable interface to:
receive, while connected with a host device via a cable, video data from pins in the cable;
a video interface to:
transmit, while connected to a display, the video data to the display, and an integrated circuit chip to:
determine, in response to detecting a connection between the video interface and the display, an amount of video bandwidth necessary for transmission of the video data to the display by the video interface based on a refresh rate of a video image included within the video data; and
a controller to:
control, in response to determining the amount of video bandwidth, the host device to reconfigure a current assignment of the pins in the cable based on the determined amount of video bandwidth in response to a determination that the current assignment is insufficient to provide the determined amount of video bandwidth.

2. The apparatus of claim 1, wherein the cable comprises a universal serial bus type-C (USB-C) cable.

3. The apparatus of claim 2, wherein the USB-C cable comprises four pairs of high-speed pins, and the four pairs of high-speed pins are assigned to transmit the video data.

4. The apparatus of claim 1, further comprising:
a 4:6 multiplexer to map pairs of the pins that are re-assigned.

5. The apparatus of claim 1, further comprising:
the integrated circuit chip to calculate the amount of video bandwidth.

6. The apparatus of claim 5, wherein the integrated circuit chip comprises a display port multi-streaming transport hub chip of a docking station.

7. The apparatus of claim 5, wherein the integrated circuit chip comprises a scaler chip of a display.

8. The apparatus of claim 5, wherein the controller is communicatively coupled to the cable interface, the video interface, and the integrated circuit chip.

9. The apparatus of claim 1, wherein the controller is to determine the amount of video bandwidth based on characteristics of the video image.

10. The apparatus of claim 1, wherein the controller is to determine the amount of video bandwidth based on a number of bits of the video image.

11. The apparatus of claim 1, wherein the controller is to determine the amount of video bandwidth based on a resolution of the display.

12. A method, comprising:
determining, by a processor in response to detecting a connection between a video output and a display, an amount of video bandwidth used by the video output;
determining, by the processor, that the amount of video bandwidth is greater than an available bandwidth of a high-speed cable based on a first pair of pins of the high-speed cable that are assigned to transmit video data;
assigning, by the processor, a second pair of pins of the high-speed cable to transmit the video data based on the amount of video bandwidth;
causing, by the processor, a host device to assign the second pair of pins of the high-speed cable to transmit the video data; and
providing, by the processor, the video data to the video output via the first pair of pins and the second pair of pins of the high-speed cable,
wherein the determining the amount of video bandwidth comprises: receiving, by the processor, the amount of video bandwidth that is used from an integrated circuit chip in communication with the display, and
wherein the integrated circuit chip calculates the amount of bandwidth based on a refresh rate of a video image included within the video data.

13. The method of claim 12, wherein the amount of video bandwidth is calculated when the display is initially connected to the video output.

14. The method of claim 13, wherein the amount of video bandwidth is calculated based on a resolution of the display.

15. The method of claim 12, wherein the causing the host device to assign the second pair of pins comprises:
presenting, by the processor, a single configuration option to the host device that includes the first pair of pins and the second pair of pins of the high-speed cable assigned to transmit the video data.

16. The method of claim 12, wherein the integrated circuit chip comprises a scaler chip or a display port media stream transport hub chip.

17. A non-transitory computer-readable storage medium encoded with instructions executable by a processor, the non-transitory computer-readable storage medium comprising:
instructions to cause the processor to receive an indication that an amount of bandwidth used by a video output is greater than an available amount of bandwidth on two pairs of pins of a universal serial bus type-C (USB-C) cable;
instructions to cause a host device connected via the USB-C cable to assign two additional pairs of pins of the USB-C cable to transmit video data;
instructions to cause the host device to receive the video data over the two pairs of pins and the two additional pairs of pins of the USB-C cable; and
instructions to cause the host device to transmit the video data to the video output,
wherein the instructions to cause the processor to receive the indication are performed each time a new display is communicatively coupled to an integrated circuit chip that is communicatively coupled to the processor,
wherein the indication comprises receiving, by the processor, the amount of video bandwidth that is used from the integrated circuit chip in communication with a display,
wherein the integrated circuit chip calculates the amount of bandwidth based on a refresh rate of a video image included within the video data.

18. The non-transitory computer-readable storage medium of claim 17, wherein the two additional pairs of pins of the USB-C cable comprise pin pairs (A2, A3), (B10, B11), (B2, B3), and (A10, A11).

* * * * *